(12) United States Patent
Lee et al.

(10) Patent No.: US 11,356,818 B2
(45) Date of Patent: Jun. 7, 2022

(54) ELECTRONIC DEVICE AND CELL SELECTION METHOD THEREOF

(71) Applicant: SAMSUNG ELECTRONICS CO., LTD., Suwon-si (KR)

(72) Inventors: Keonyoung Lee, Suwon-si (KR); Sangwon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 109 days.

(21) Appl. No.: 17/084,960

(22) Filed: Oct. 30, 2020

(65) Prior Publication Data

US 2021/0144522 A1  May 13, 2021

(30) Foreign Application Priority Data

Nov. 11, 2019  (KR) .................. 10-2019-0143832

(51) Int. Cl.
*H04W 4/20* (2018.01)
*H04W 48/16* (2009.01)
(Continued)

(52) U.S. Cl.
CPC ............. *H04W 4/20* (2013.01); *H04W 8/183* (2013.01); *H04W 48/10* (2013.01); *H04W 48/16* (2013.01); *H04W 80/08* (2013.01); *H04W 84/042* (2013.01)

(58) Field of Classification Search
CPC ....... H04W 4/20; H04W 8/183; H04W 48/10; H04W 48/16; H04W 80/08;
(Continued)

(56) References Cited

U.S. PATENT DOCUMENTS

| | | |
|---|---|---|
| 2005/0221848 A1 | 10/2005 | Chitrapu et al. |
| 2019/0223091 A1 | 7/2019 | Huang-Fu et al. |

(Continued)

FOREIGN PATENT DOCUMENTS

| | | |
|---|---|---|
| KR | 10-2019-0106302 | 9/2019 |
| WO | 2019/006085 | 1/2019 |
| WO | 2019/122988 | 6/2019 |

OTHER PUBLICATIONS

International Search Report dated Feb. 10, 2021 in corresponding International Application No. PCT/KR2020/014993.

(Continued)

*Primary Examiner* — Diane D Mizrahi
(74) *Attorney, Agent, or Firm* — Nixon & Vandherhye, P.C.

(57) ABSTRACT

An electronic device according to various embodiments may include: a wireless communication circuit, and a processor operatively connected to the wireless communication circuit, wherein the processor is configured to: receive first system information broadcast from a first base station supporting a first cellular network using the wireless communication circuit, identify whether the first base station is broadcasting second system information including information of a second base station supporting a second cellular network neighboring the first base station from the first system information, establish a connection with the second base station based on the second system information being received using the wireless communication circuit based on identifying that the first base station is broadcasting the second system information, and establish the connection with the second base station based on third system information being received using the wireless communication circuit based on identifying that the first base station is not broadcasting the second system information.

20 Claims, 12 Drawing Sheets

(51) Int. Cl.
   *H04W 80/08*   (2009.01)
   *H04W 8/18*    (2009.01)
   *H04W 48/10*   (2009.01)
   *H04W 84/04*   (2009.01)

(58) Field of Classification Search
   CPC ... H04W 84/042; H04W 48/18; H04W 48/12;
                  H04W 4/06; H04W 88/06
   See application file for complete search history.

(56) References Cited

U.S. PATENT DOCUMENTS

| | | |
|---|---|---|
| 2020/0280827 A1 | 9/2020 | Fechtel et al. |
| 2021/0007026 A1 | 1/2021 | Kho et al. |
| 2021/0084524 A1 | 3/2021 | Foti et al. |
| 2022/0104109 A1* | 3/2022 | Lei ..................... H04W 72/048 |

OTHER PUBLICATIONS

Qualcomm Incorporated, "Introduction of Rel-16 eMTC enhancements", R2-1915717, 3GPP TSG-RAN2 Meeting #18, Reno, Nevada, Nov. 8, 2019.

* cited by examiner

ELECTRONIC DEVICE AND CELL SELECTION METHOD THEREOF

CROSS-REFERENCE TO RELATED APPLICATION

This application is based on and claims priority under 35 U.S.C. § 119 to Korean Patent Application No. 10-2019-0143832, filed on Nov. 11, 2019, in the Korean Intellectual Property Office, the disclosure of which is incorporated by reference herein in its entirety.

BACKGROUND

Field

The disclosure relates to an electronic device, and for example, to a cell selection method of an electronic device, which can access one or more cellular networks.

Description of Related Art

To meet the increasing demand for wireless data traffic since the commercialization of the 4G communication system, efforts have been made to develop an improved 5G communication system or pre-5G communication system. Therefore, the 5G communication system or pre-5G communication system has been called a "beyond 4G network" communication system or a "post LTE system". Implementation of the 5G communication system in ultrahigh frequency (mmWave) bands (e.g., 60 Giga (70 GHz) bands) is being considered in order to accomplish higher data rates. To mitigate a path loss of radio waves and increase the transfer distance on the radio waves in the ultrahigh frequency bands, beamforming, massive multiple-input multiple-output (massive MIMO), full dimensional MIMO (FD-MIMO), array antennas, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving networks, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

In the process of changing from a legacy network communication to an improved network communication (e.g., 5G NR), a user terminal (or electronic device) may support both the legacy network communication and the improved network communication. In this case, if the electronic device belongs to the coverage of a cell of a legacy network and a cell of an improved network, it is necessary for the electronic device to access the cell of the improved network.

SUMMARY

Embodiments of the disclosure can provide an electronic device capable of selecting and accessing a cell of an improved network and a cell selection method of the electronic device.

An electronic device according to various example embodiments may include: a wireless communication circuit; and a processor operatively connected to the wireless communication circuit, wherein the processor is configured to: receive first system information being broadcast from a first base station supporting a first cellular network using the wireless communication circuit, identify whether the first base station is broadcasting second system information including information of a second base station supporting a second cellular network neighboring the first base station from the first system information, establish a connection with the second base station based on the second system information received using the wireless communication circuit based on identifying that the first base station is broadcasting the second system information, and establish the connection with the second base station based on third system information received using the wireless communication circuit based on identifying that the first base station is not broadcasting the second system information.

A cell selection method of an electronic device according to various example embodiments may include: receiving first system information broadcast from a first base station supporting a first cellular network; identifying whether the first base station is broadcasting second system information including information of a second base station supporting a second cellular network neighboring the first base station from the first system information; establishing a connection with the second base station based on the second system information being received using a wireless communication circuit based on identifying that the first base station is broadcasting the second system information; and establishing the connection with the second base station based on third system information received using the wireless communication circuit based on identifying that the first base station is not broadcasting the second system information.

According to various example embodiments, it is possible to provide an electronic device capable of selecting and accessing a cell of an improved network and a cell selection method of the electronic device.

Effects that can be obtained in the disclosure are not limited to the above-described effects, and other effects can be clearly understood by those of ordinary skill in the art to which the disclosure pertains from the following disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
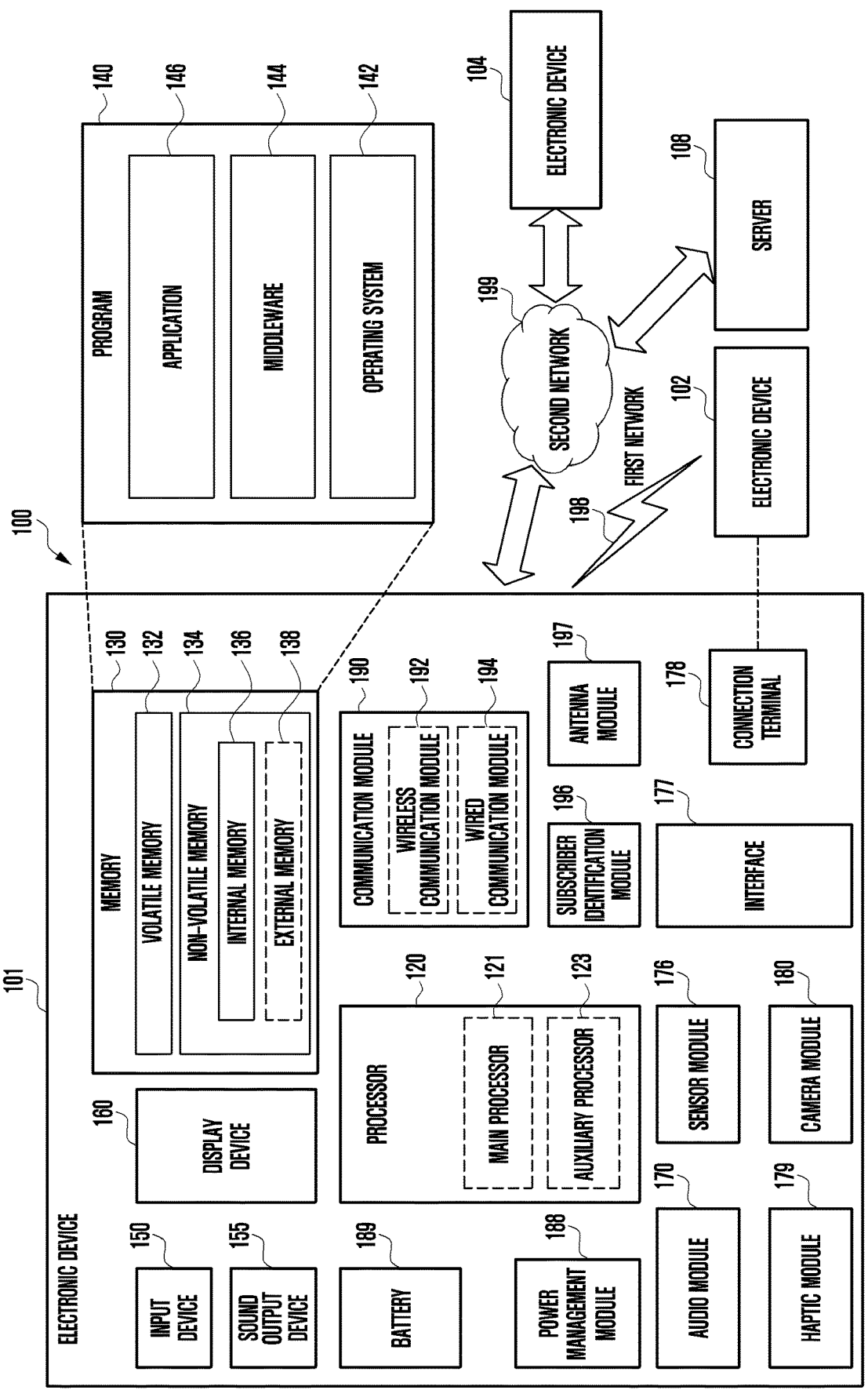
FIG. 1 is a block diagram illustrating an example electronic device according to various embodiments of the disclosure.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
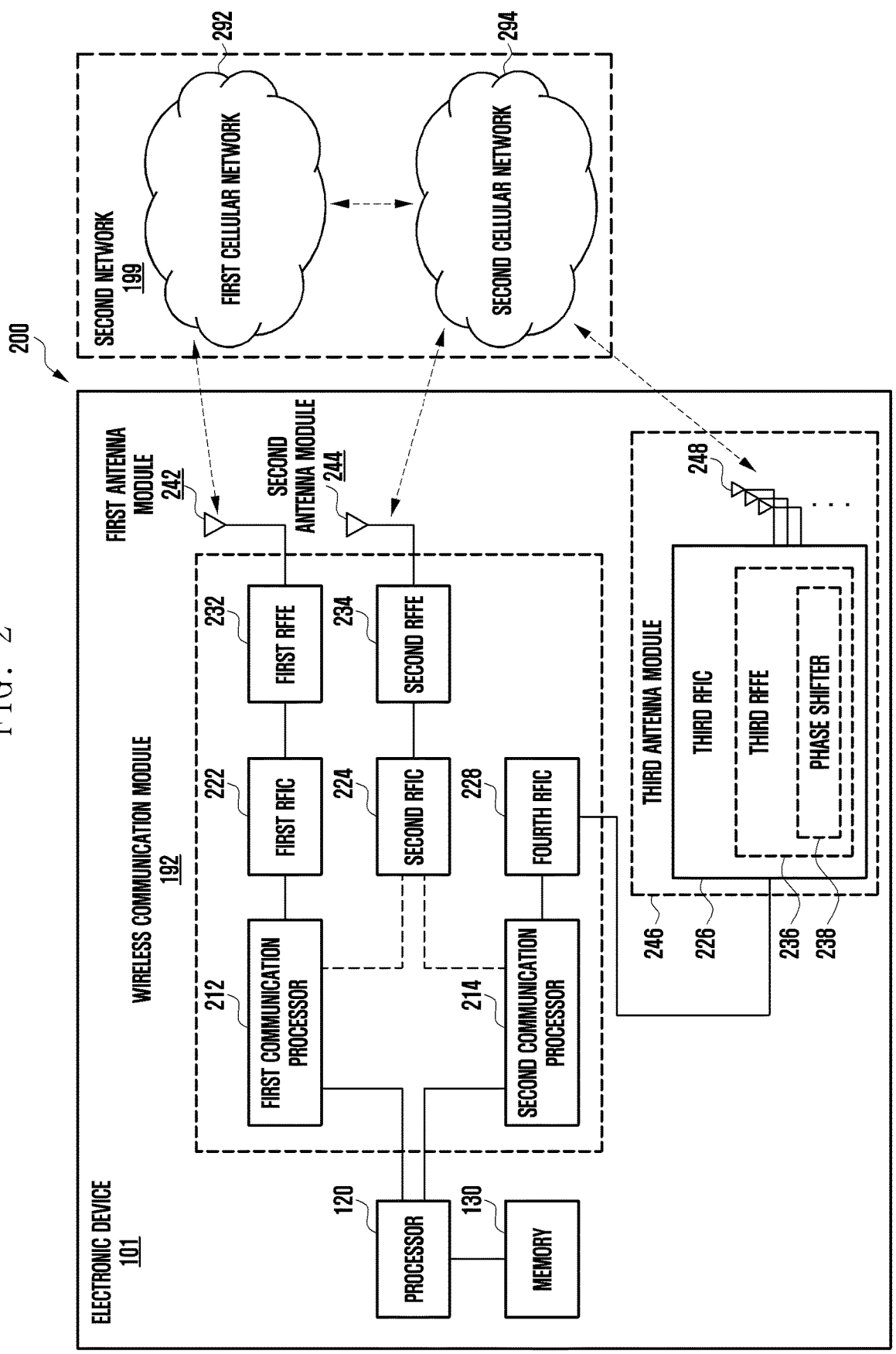
FIG. 2 is a block diagram illustrating an example electronic device supporting a legacy network communication and a 5G network communication according to various embodiments.

FIG. 2 is a block diagram illustrating an example electronic device supporting a legacy network communication and a 5G network communication according to various embodiments.

With reference to FIG. 2, an electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 199 may include a first network 292 and a second network 294. According to another embodiment, the electronic device 101 may further include at least one of components described in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment, the fourth RFIC 228 may be omitted, or may be included as a part of the third RFIC 226.

The first communication processor 212 may establish a communication channel of a band to be used for a wireless communication with the first network 292, and may support a legacy network communication through the established communication channel. According to various embodiments, the first network 292 may be a legacy network including the second generation (2G), 3G, 4G, or long term evolution (LTE) network. The second communication processor 214 may establish the communication channel corresponding to a designated band (e.g., about 6 GHz to about 60 GHz) among bands to be used for the wireless communication with the second network 294, and may support the 5G network communication through the established communication channel. According to various embodiments, the second network 294 may be the 5G network defined in 3GPP. In addition, according to an embodiment, the first communication processor 212 or the second communication processor 214 may establish the communication channel corresponding to another designated band (e.g., about 6 GHz or less) among the bands to be used for the wireless communication with the second network 294, and may support the 5G network communication through the established communication channel. According to an embodiment, the first communication processor 212 and the second communication processor 214 may be implemented in a single chip or a single package. According to various embodiments, the first communication processor 212 or the second communication processor 214 may be formed in the single chip or the single package together with the processor 120, the auxiliary processor 123, or the communication module 190.

During transmission, the first RFIC 222 may convert a baseband signal generated by the first communication processor 212 into a radio frequency (RF) signal of about 700 MHz to about 3 GHz being used in the first network 292 (e.g., legacy network). During reception, the RF signal may be acquired from the first network 292 (e.g., legacy network) through the antenna (e.g., first antenna module 242), and may be preprocessed through the RFFE (e.g., first RFFE 232). The first RFIC 222 may convert the preprocessed RF signal into the baseband signal so as to be processed by the first communication processor 212.

During transmission, the second RFIC 224 may convert the baseband signal generated by the first communication processor 212 or the second communication processor 214 into an RF signal (hereinafter, 5G Sub6 RF signal) of a Sub6 band (e.g., about 6 GHz or less) being used in the second network 294 (e.g., 5G network). During reception, the 5G Sub6 RF signal may be acquired from the second network 294 (e.g., 5G network) through the antenna (e.g., second antenna module 244), and may be preprocessed through the RFFE (e.g., second RFFE 234). The second RFIC 224 may convert the preprocessed 5G Sub6 RF signal into the baseband signal so as to be processed by the corresponding communication processor of the first communication processor 212 or the second communication processor 214.

The third RFIC 226 may convert the baseband signal generated by the second communication processor 214 into an RF signal (hereinafter, 5G Above6 RF signal) of a 5G Above6 band (e.g., about 6 GHz to about 60 GHz) to be used in the second network 294 (e.g., 5G network). During reception, the 5G Above6 RF signal may be acquired from the second network 294 (e.g., 5G network) through the antenna (e.g., antenna 248), and may be preprocessed through the third RFFE 236. The third RFIC 226 may convert the preprocessed 5G Above6 RF signal into the baseband signal so as to be processed by the second communication processor 214. According to an embodiment, the third RFFE 236 may be formed as a part of the third RFIC 226.

According to an embodiment, the electronic device 101 may include the fourth RFIC 228 separately from or as at least a part of the third RFIC 226. In this case, the fourth RFIC 228 may convert the baseband signal generated by the second communication processor 214 into an RF signal (hereinafter, IF signal) of an intermediate frequency band (e.g., about 9 GHz to about 11 GHz), and then may transfer the IF signal to the third RFIC 226. The third RFIC 226 may convert the IF signal into the 5G Above6 RF signal. During reception, the 5G Above6 RF signal may be received from the second network 294 (e.g., 5G network) through the antenna (e.g., antenna 248), and may be converted into the IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted or may be coupled to another antenna module to process RF signals of a plurality of corresponding bands.

According to an embodiment, the third RFIC 226 and the antenna 248 may be deployed on the same substrate to form the third antenna module 246. For example, the wireless communication module 192 or the processor 120 may be deployed on a first substrate (e.g., main PCB). In this case, the third antenna module 246 may be formed in a manner that the third RFIC 226 is deployed on a partial area (e.g., bottom side) of a second substrate separated from the first substrate (e.g., sub PCB) and the antenna 248 is deployed on another partial area (e.g., top side) thereof. By deploying the third RFIC 226 and the antenna 248 on the same substrate, it is possible to reduce the length of a transmission path provided between them. That is, for example, it is possible to reduce a loss (e.g., attenuation) of a signal of a high frequency band (e.g., about 6 GHz to about 60 GHz) being used for the 5G network communication, which is caused by the transmission path. Due to this, the electronic device 101 can improve the quality or speed of the communication with the second network 294 (e.g., 5G network).

According to an embodiment, the antenna 248 may be formed of an antenna array including a plurality of antenna elements that can be used for beamforming. In this case, the third RFIC 226 may include, for example, as a part of the third RFFE 236, a plurality of phase shifters 238 corresponding to the plurality of antenna elements. During transmission, the plurality of phase shifters 238 may shift the phase of a 5G Above6 RF signal to be transmitted to an outside (e.g., base station of the 5G network) of the electronic device 101 through the antenna elements corresponding to the plurality of phase shifters 238, respectively. During reception, the plurality of phase shifters 238 may shift the phase of the 5G Above6 RF signal received from the outside through the corresponding antenna elements to the same or substantially the same phase. This enables transmission or reception through the beamforming between the electronic device 101 and the outside.

The second network 294 (e.g., 5G network) may operate independently of the first network 292 (e.g., legacy network) (e.g., standalone (SA)), or may be connected to the first network 292 to operate (e.g., non-standalone (NSA)). For example, in the 5G network, only an access network (e.g., 5G radio access network (RAN) or next generation RAN (NG RAN) may exist, but a core network (e.g., next generation core (NGC)) may not exist. In this case, the electronic device 101 may access the access network of the 5G network, and then may access an external network (e.g., Internet) under the control of the core network (e.g., evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

Figure 3:
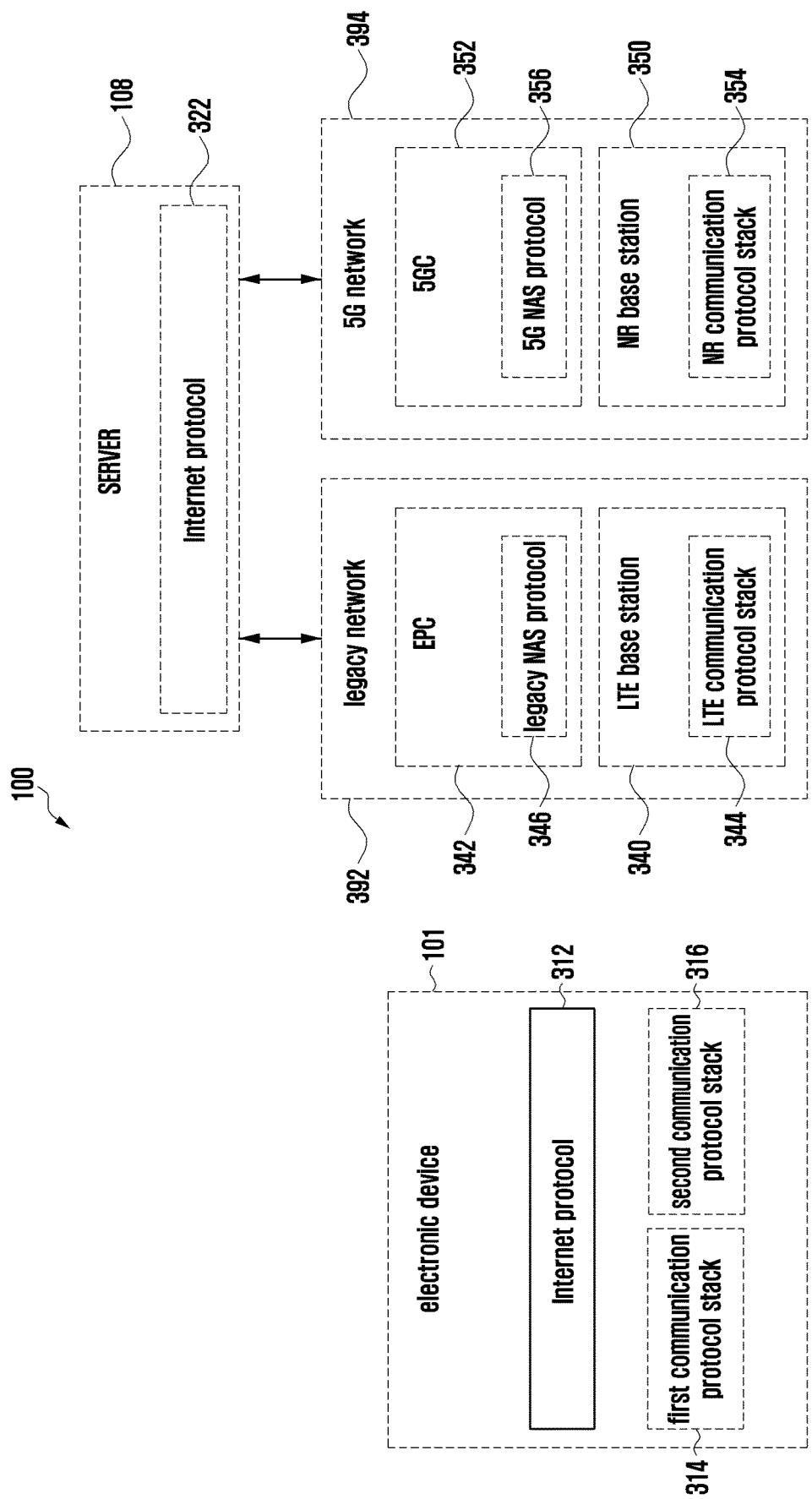
FIG. 3 is a diagram illustrating an example protocol stack structure of a network of a legacy communication and/or a 5G communication according to an embodiment.

FIG. 3 is a diagram illustrating an example protocol stack structure of a network of a legacy communication and/or a 5G communication according to an embodiment.

With reference to FIG. 3, a network according to an illustrated embodiment may include an electronic device 101, a legacy network 392, a 5G network 394, and a server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform the Internet communication related to the sever 108 using the Internet protocol 312 (e.g., TCP, UDP, or IP). The Internet protocol 312 may be executed by, for example, a main processor (e.g., main processor 121 of FIG. 1) included in the electronic device 101.

According to another embodiment, the electronic device 101 may perform wireless communication with the legacy network 392 using the first communication protocol stack 314. According to still another embodiment, the electronic device 101 may perform wireless communication with the 5G network 394 using the second communication protocol stack 316. The first communication protocol stack 314 and the second communication protocol stack 316 may be executed by, for example, one or more communication processors (e.g., wireless communication module 192 of FIG. 1) included in the electronic device 101.

The server 108 may include an Internet protocol 322. The server 108 may transmit and/or receive data related to the Internet protocol 322 to or from the electronic device 101 through the legacy network 392 and/or the 5G network 394. According to an embodiment, the server 108 may include a cloud computing server existing outside the legacy network 392 or the 5G network 394. In another embodiment, the server 108 may include an edge computing server (or mobile edge computing (MEC) server) located inside at least one of the legacy network or the 5G network 394.

The legacy network 392 may include an LTE base station 340 and an EPC 342. The LTE base station 340 may include an LTE communication protocol stack 344. The EPC 342 may include a legacy NAS protocol 346. The legacy network 392 may perform LTE wireless communication with the electronic device 101 using the LTE communication protocol stack 344 and the legacy NAS protocol 346.

The 5G network 394 may include an NR base station 350 and a 5GC 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include control plane protocols for transmitting or receiving a control message and user plane protocols for transmitting or receiving user data. The control message may include, for example, a message related to at least one of security control, bearer setup, authentication, registration, or mobility management. The user data may include, for example, remaining data excluding the control message.

According to an embodiment, the control plane protocol and the user plane protocol may include layers of physical (PHY), medium access control (MAC), radio link control (RLC), or packet data convergence protocol (PDCP). For example, the PHY layer may perform channel coding and modulation of data received from a higher layer (e.g., MAC layer) to transmit the channel-coded and modulated data on a radio channel, and may perform demodulation and decoding of the data received on the radio channel to transfer the demodulated and decoded data to the higher layer. The PHY layer included in the second communication protocol stack 316 and the NR communication protocol stack 354 may further perform an operation related to the beamforming. For example, the MAC layer may perform logical/physical mapping of the data onto the radio channel to transmit and/or receive the data, and may perform a hybrid automatic repeat request (HARD) for error correction. For example, the RLC layer may perform concatenation, segmentation, or reassembly of the data, and may perform an order check, realignment, or redundancy check of the data. For example, the PDCP layer may perform operations related to ciphering of the control data and the user data and data integrity thereof. The second communication protocol stack 316 and the NR communication protocol stack 354 may further include a service data adaptation protocol (SDAP). For example, the SDAP may manage radio bearer allocation based on the quality of service (QoS) of the user data.

According to various embodiments, the control plane protocol may include a radio resource control (RRC) layer and a non-access stratum (NAS) layer. For example, the RRC layer may process the control data related to the radio bearer setup, paging, or mobility management. For example, the NAS may process the control message related to the authentication, registration, and mobility management.

Figure 4A:
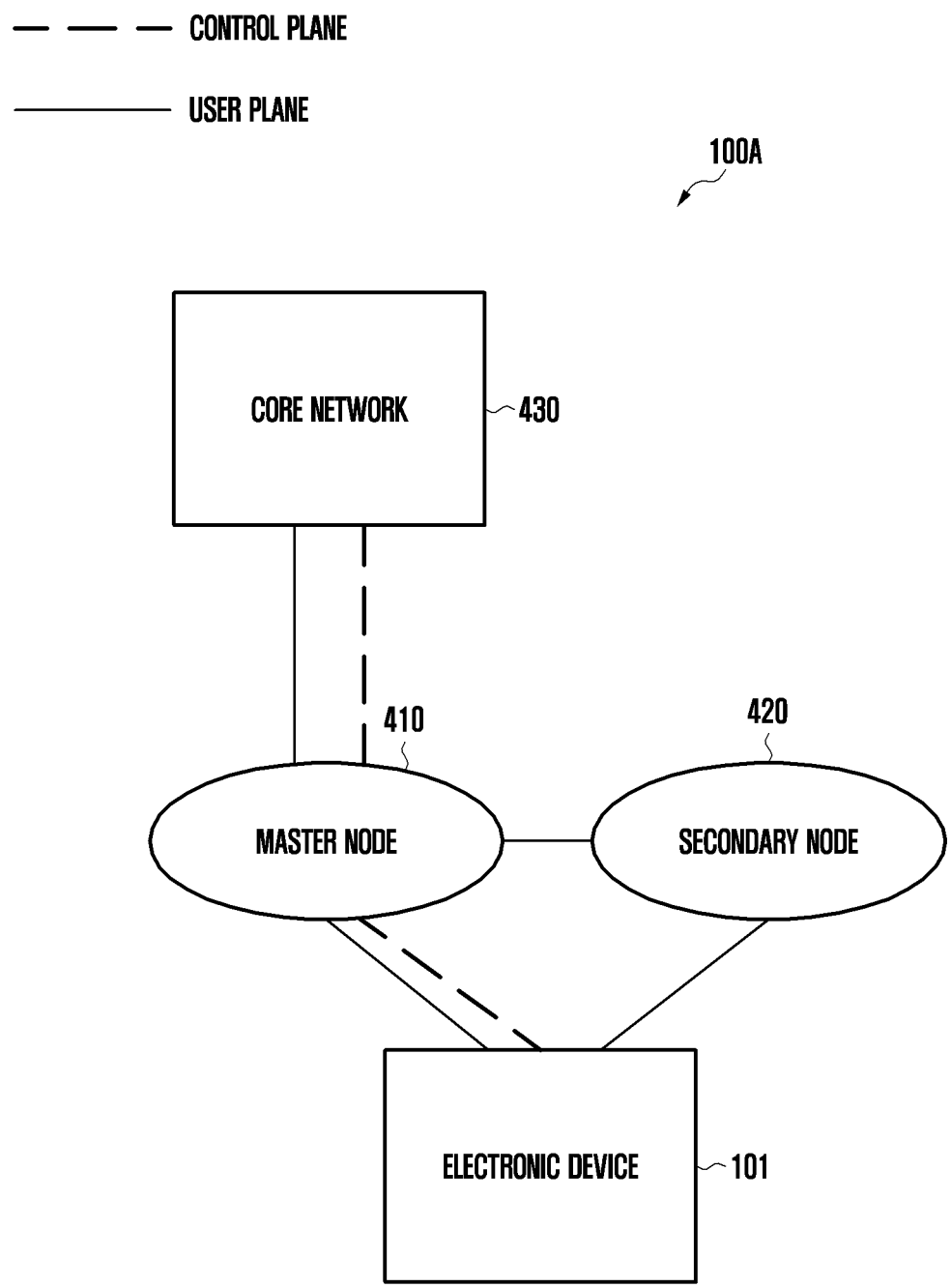
FIG. 4A is a diagram illustrating an example wireless communication system providing a network of a legacy communication and/or a 5G communication according to various embodiments.
Figure 4B:
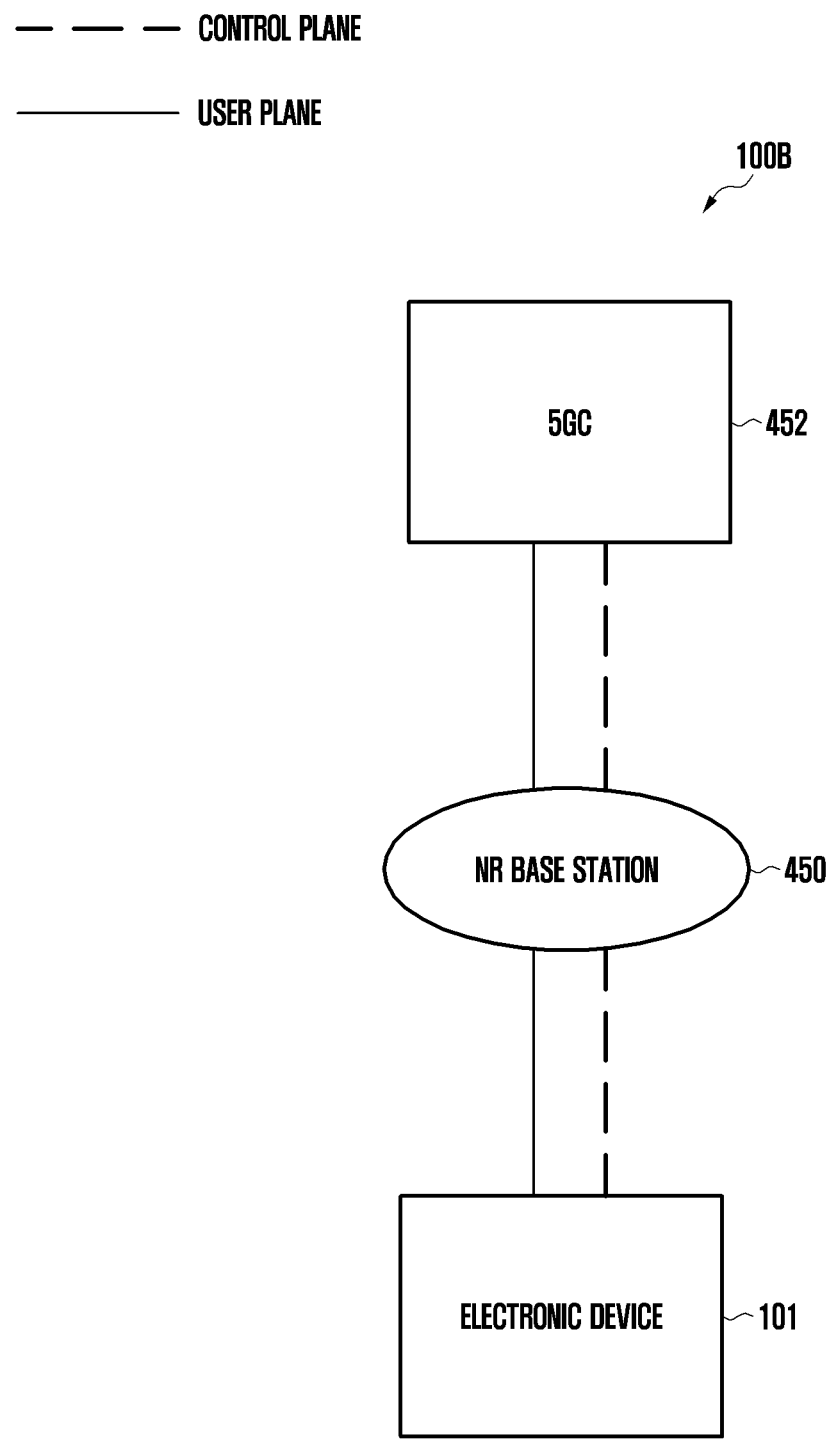
FIG. 4B is a diagram illustrating an example wireless communication system providing a network of a legacy communication and/or a 5G communication according to various embodiments.
Figure 4C:
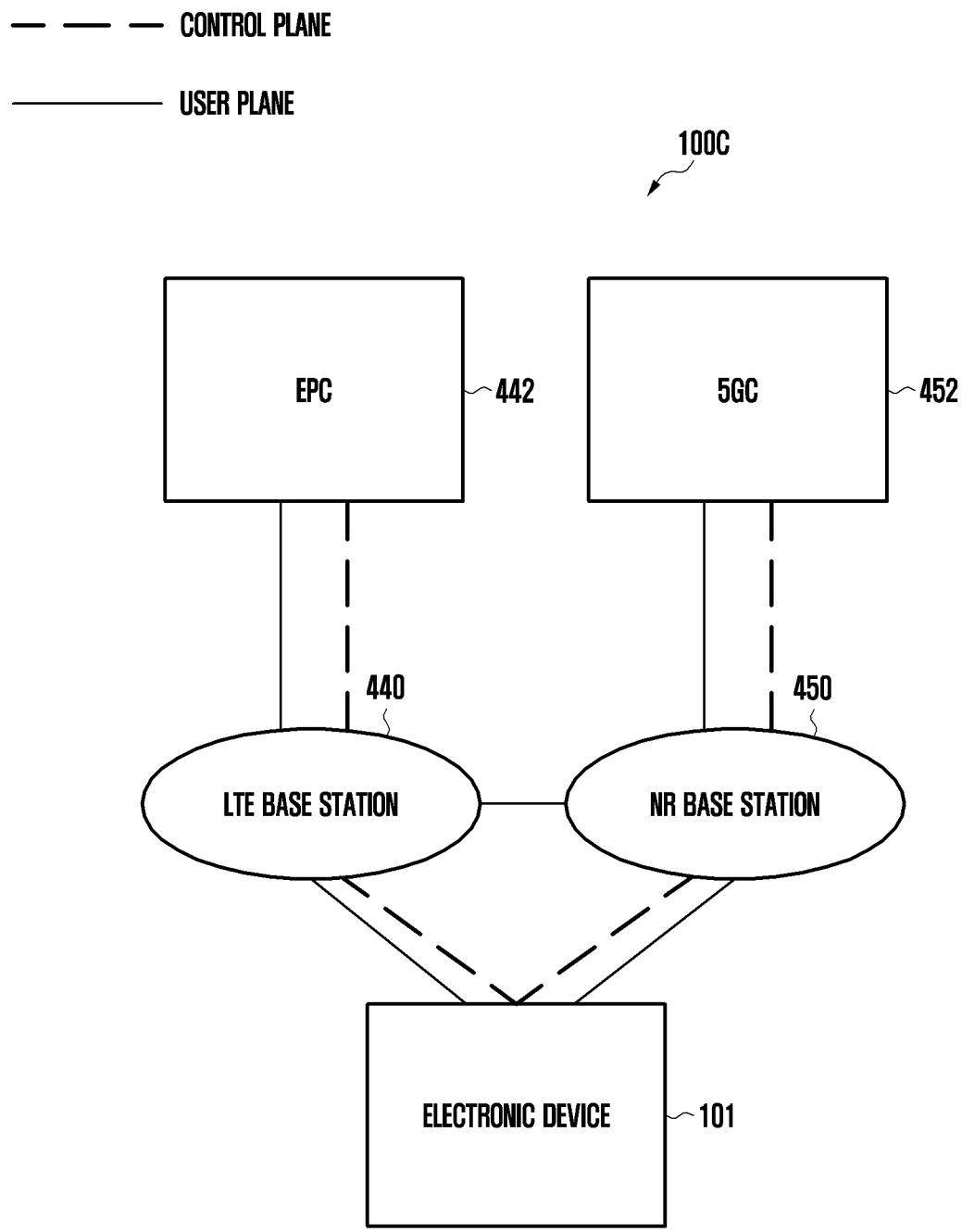
FIG. 4C is a diagram illustrating an example wireless communication system providing a network of a legacy communication and/or a 5G communication according to various embodiments.

FIGS. 4A, 4B and 4C are diagrams illustrating example wireless communication systems providing a network of a legacy communication and/or a 5G communication according to various embodiments.

With reference to FIGS. 4A, 4B and 4C, each of network environments 100A, 100B and 100C may include at least one of a legacy network and a 5G network. For example, the legacy network may include a 4G base station 440 or LTE base station 450 (e.g., eNB (eNodeB)) of 3GPP standards supporting a radio access to the electronic device 101, and an evolved packet core (EPC) 442 managing 4G communication. For example, the 5G network may include a new radio (NR) base station 450 (e.g., gNB (gNodeB)) supporting a radio access to the electronic device 101, and a 5th generation core (5GC) 452 managing the 5G communication of the electronic device 101.

According to various embodiments, the electronic device 101 may transmit and/or receive a control message and user data through the legacy communication and/or 5G communication. For example, the control message may include a message related to at least one of security control, bearer setup, authentication, registration, or mobility management of the electronic device 101. For example, the user data may refer, for example, to user data excluding the control message being transmitted and/or received between the electronic device 101 and a core network 430 (e.g., EPC 442 of FIG. 4C).

With reference to FIG. 4A, the electronic device 101 according to an embodiment may transmit and/or receive at least one of the control message, or the user data to or from at least parts of the 5G network (e.g., NR base station 450 and 5GC 452 of FIG. 4C) using at least parts of the legacy network (e.g., LTE base station 440 and EPC 442 of FIG. 4C).

According to various embodiments, the network environment 100A may include a network environment which provides multi-radio access technology (RAT) dual connectivity (MR-DC) to the LTE base station 440 and the NR base station 450 and transmits and/or receives the control message to or from the electronic device 101 through one core network 430 of the EPC 442 or the 5GC 452.

According to various embodiments, in the MR-DC environment, one of the LTE base station 440 or the NR base station 450 may operate as a master node (MN) 410, and the other may operate as a secondary node (SN) 420. The MN 410 may be connected to the core network 430, and may transmit and/or receive the control message. The MN 410 and the SN 420 may be connected through a network interface, and may mutually transmit and/or receive a message related to radio resource (e.g., communication channel) management.

According to various embodiments, the MN 410 may include the LTE base station 450, the SN 420 may include the NR base station 450, and the core network 430 may include the EPC 442. For example, the control message may be transmitted and/or received through the LTE base station 440 and the EPC 442, and the user data may be transmitted and/or received through the LTE base station 450 and the NR base station 450.

With reference to FIG. 4B, according to various embodiments, the 5G network may transmit and/or receive the control message and the user data independently of the electronic device 101.

With reference to FIG. 4C, the legacy network and the 5G network according to various embodiments may independently provide data transmission or reception. For example, the electronic device 101 and the EPC 442 may transmit and/or receive the control message and the user data through the LTE base station 450. As another example, the electronic device 101 and the 5GC 452 may transmit and/or receive the control message and the user data through the NR base station 450.

According to various embodiments, the electronic device 101 may be registered in at least one of the EPC 442 or the 5GC 452, and may transmit and/or receive the control message.

According to various embodiments, the EPC 442 and the 5GC 452 may interwork with each other to manage the communication of the electronic device 101. For example, movement information of the electronic device 101 may be transmitted and/or received through an interface between the EPC 442 and the 5GC 452.

Figure 5:
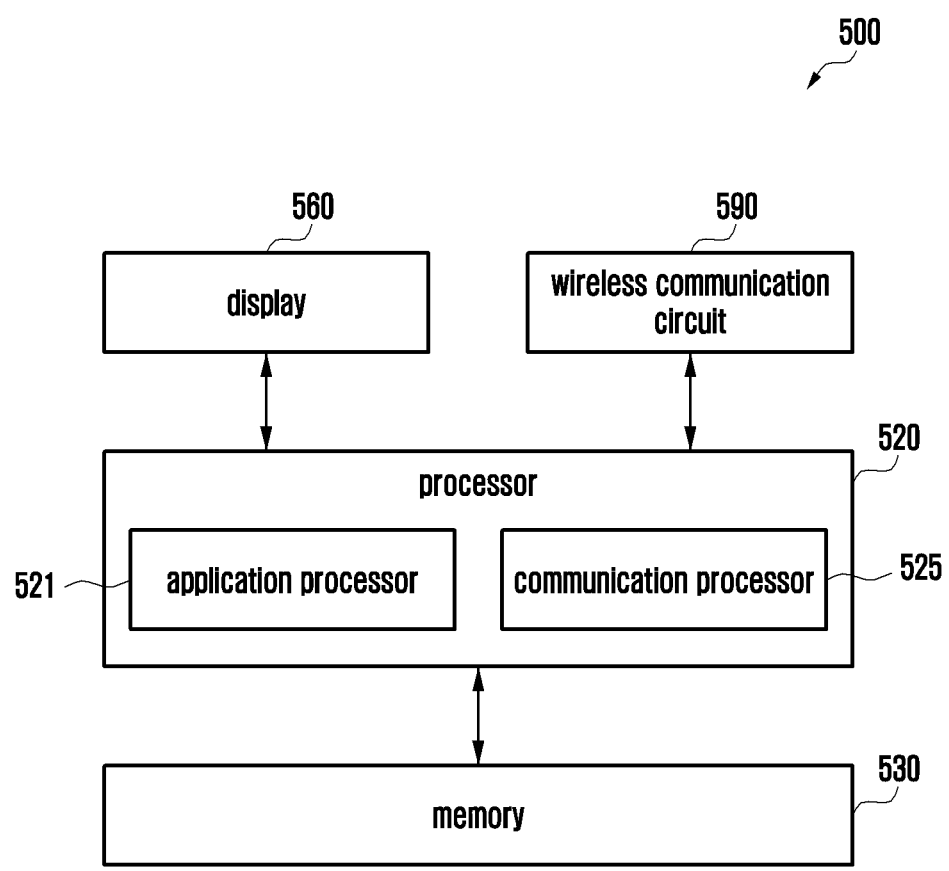
FIG. 5 is a block diagram illustrating an example electronic device according to various embodiments.

FIG. 5 is a block diagram illustrating an example electronic device according to various embodiments.

With reference to FIG. 5, an electronic device 500 may include a display 560, a wireless communication circuit 590, a processor (e.g., including processing circuitry) 520, and a memory 530, and at least parts of the illustrated configurations may be omitted and/or replaced. The electronic device 500 may include at least parts of the configurations and/or functions of the electronic device 101 of FIGS. 1 to 3.

According to various embodiments, the configurations and performable functions of the electronic device 500 may not be specifically determined, but hereinafter, features necessary for cell selection will be mainly described.

According to various embodiments, the display 560 may output an image being transmitted from an application processor 521. The display 560 may include various types of touchscreens, and the electronic device 500 may provide various graphic user interfaces (hereinafter, GUIs) using the display 560.

According to various embodiments, the wireless communication circuit 590 may include various circuit structures being used for signal modulation and/or demodulation in the electronic device 500. For example, the wireless communication circuit 590 may modulate a baseband signal into a radio frequency (RF) band signal to output the modulated signal through an antenna, or may demodulate the RF band signal being received through the antenna into the baseband signal to transmit the demodulated signal to the processor 520. The wireless communication circuit 590 may include various RFICs (e.g., the first RFIC 222, the second RFIC 224, the third RFIC 236, and the fourth RFIC 228 of FIG. 2) and/or RF front end modules (e.g., the first RFFE 232, the second RFFE 234, and the third RFFE 236 of FIG. 2), and the configurations of the wireless communication circuit 590 may be included in the same chip in all, or parts of the configurations may be included in different chips.

According to various embodiments, the memory 530 may include a volatile memory (e.g., volatile memory 132 of FIG. 1) and a nonvolatile memory (e.g., nonvolatile memory 134 of FIG. 1). According to various embodiments, the memory 530 may store various instructions capable of being executed through the processor 520 (or application processor 521). The memory 530 may store the program 140 of FIG. 1.

According to various embodiments, the memory 530 may store databases for storing information on cells previously accessed by the electronic device 500.

According to various embodiments, the processor 520 may include various processing circuitry, including the application processor 521 and a communication processor 525. The operation of the processor 520 being described in this disclosure may be performed by the application processor 521 or the communication processor 525, or a part of the operation may be performed on the application processor 521 and the communication processor 525. The application processor 521 and the communication processor 525 may be included in the same chip, or parts thereof may be included in different chips. The processor 520 may be functionally, operatively, and/or electrically connected to internal constituent elements of the electronic device 500 including the display 560, the wireless communication circuit 590, and the memory 530.

According to various embodiments, the application processor 521 may include a configuration capable of performing a control of respective constituent elements of the electronic device 500 and/or a communication operation or data processing, and may include at least parts of configurations and/or functions of the main processor of FIG. 1. The operations of the application processor 521 may be performed by loading instructions stored in the memory 530.

According to various embodiments, the communication processor 525 may perform various operations for wireless communication on the first cellular network and/or the second cellular network. For example, the communication processor 525 may establish a communication channel of a band to be used for wireless communication with the first cellular network and/or the second cellular network, and may support the wireless communication through the established communication channel.

According to various embodiments, the electronic device may include a first communication processor (e.g., first communication processor 212 of FIG. 2) corresponding to the first cellular network and a second communication processor (e.g., second communication processor 214 of FIG. 2) corresponding to the second cellular network, and the operation of the communication processor 525 to be described in greater detail below may be the operations of the first communication processor corresponding to the first cellular network and/or the second communication processor corresponding to the second cellular network. Alternatively, the electronic device 500 may include one communication processor supporting wireless communication of the first cellular network and the second cellular network.

According to various embodiments, the first cellular network (e.g., first network 292 of FIG. 2) may be a legacy network including the 2nd generation (2G), 3G, 4G, or long term evolution (LTE) network. The second cellular network (e.g., second network 294 of FIG. 2) may be the 5G new radio (NR) network defined in 3GPP. Hereinafter, although explanation will be made under the assumption that the first cellular network is the LTE network and the second cellular network is the 5G NR network, any system in which the legacy network and the improved network coexist is not necessary to be limited thereto.

According to various embodiments, the second cellular network may support non-standalone (NSA) or standalone (SA). The NSA may be a method in which the electronic device 500 transmits and/or receives the control message and/or the user data to or from at least parts (e.g., NR base station and 5GC) of the second cellular network (e.g., 5G NR) using at least parts (e.g., LTE base station and EPC) of the first cellular network (e.g., LTE) as shown in FIG. 4A. The network environment of the NSA provides multi-radio access technology (RAT) dual connectivity (MR-DC) to the first base station (e.g., LTE base station) and the second base station (e.g., NR base station), and data can be transmitted and/or received between the electronic device 500 and the network through one core network of the EPC or the 5GC.

According to various embodiments, the SA may be a method in which the second cellular network operates independently of the first cellular network as shown in FIG. 4C. For example, the electronic device 500 may transmit and/or receive the control message and the user data through the second base station (e.g., NR base station), and may be registered in the 5GC.

According to various embodiments, the first base station of the first cellular network may support the NSA, for example, may be the LTE base station of FIG. 4A, and the second base station of the second cellular network may support the SA, for example, may be the NR base station of FIG. 4C.

According to various embodiments, the communication processor 525 may configure a network to be accessed in accordance with a network mode configured by a user. For example, the application processor 521 may provide a GUI capable of selecting a network mode (e.g., 5G SA preference mode and LTE preference mode) using the display 560, and may determine the network mode in accordance with the user's selection. The operation of reselecting the cell of the 5G NR network supporting the standalone (SA) to be described later may be performed in case that the 5G SA preference mode is selected as the network mode. The GUI capable of selecting the network mode will be described in detail through FIG. 8.

The electronic device 500 according to various embodiments may identify the second cellular network that can be accessed by the electronic device 500 based on system information being received from the first cellular network, and may attempt a connection with the second cellular network.

According to various embodiments, the electronic device 500 may operate in a standby mode during an initial turn-on and/or during movement. The standby mode may refer, for example, to a radio resource control (RRC) idle mode, and corresponds to a state where the network-resource control connection has not been made. In the RRC idle mode state, the electronic device 500 may autonomously reselect the cell.

According to various embodiments, in the standby mode, the electronic device 500 may receive the system information from the first base station (e.g., LTE base station (eNB)) of the first cellular network (e.g., LTE). The system information may include, for example a system information block (SIB).

According to various embodiments, the first base station may periodically broadcast the system information of the corresponding cell in order to make the neighboring electronic device 500 access the cell. The first cellular network may broadcast a master information block (MIB) and the SIB. The first cellular network may broadcast the SIB including primary parts of the system information on a downlink transmission channel (DL-SCH).

According to various embodiments, the first cellular network may define a plurality of different SIBs in accordance with the kind of the included information. Hereinafter, the contents of the SIB, which are necessary for the cell reselection, will be described, but the contents being defined in 3GPP may be further included. Hereinafter, although SIB 1 may be referred to as first system information, SIB 24 may be referred to as second system information, and SIB 2 may be referred to as third system information, the first system information, the second system information, and/or the third system information are not limited thereto.

According to various embodiments, the SIB 1 may mainly include information related to whether the electronic device 500 can use a service through an access to the corresponding cell. For example, the SIB 1 may include operator information of the corresponding cell and information on restrictions during the cell access. Further, the SIB 1 may include scheduling information on a time domain of the remaining SIBs. For example, the SIB 1 may include system information (SI) scheduling information on what SIB is transmitted from the first base station.

According to various embodiments, the SIB 2 may include information that is necessary for the electronic device 500 to access the cell. The SIB 2 may include information on an uplink cell bandwidth, a random access parameter, and a parameter related to the uplink power control. The SIB 2 may include information (e.g., upperLayerIndication-r15) indicating a higher layer of the cellular network. The upperLayerIndication-r15 may include information indicating that the electronic device 500 belongs to a higher layer, for example, a coverage of the second cellular network, when the electronic device 500 enters the coverage area that provides the second cellular network (e.g., 5G NR).

According to various embodiments, the SIB 24 may include information related to inter-radio access technology (RAT) reselection. The inter-RAT reselection may refer, for example, to the cell being reselected from the LTE network to the 5G NR network. The SIB 24 may include a frequency of an NR cell, information on a neighboring NR cell, and/or cell reselection parameters.

Information elements of the SIB 24 may be the same as or similar to those described in 3GPP TS 36.331 v15.6.

The SIB 24 is provided by the LTE cell in case that the NR cell supporting the SA is in the neighborhood, and some LTE base stations may not transmit the SIB 24. The electronic device 500 according to various embodiments may reselect the NR cell supporting the SA using the information of the SIB 2 even in case that the LTE base station does not broadcast the SIB 24.

According to various embodiments, the communication processor 525 may receive the first system information (e.g., SIB 1) broadcast from the first base station (e.g., LTE base station) using the wireless communication circuit 590.

According to various embodiments, the communication processor 525 may identify whether the first base station is broadcasting the second system information from the first system information. The second system information may include the SIB 24. The first system information may include information on scheduling of the remaining system information (e.g., SIBs), and the communication processor 525 may identify whether the first base station is broadcasting the second system information from the system information (SI) scheduling information of the first system information.

According to various embodiments, if it is identified that the first base station is broadcasting the second system information as the result of identifying the first system information, the communication processor 525 may perform a connection (or cell reselection) with the second base station using the second system information being received thereafter.

Where the first base station is broadcasting the second system information (SIB 24), various embodiments of an operation of reselecting the 5G SA cell will be described in greater detail below with reference to FIG. 6.

According to various embodiments, if it is identified that the first base station is not broadcasting the second system information as the result of identifying the first system information, the communication processor 525 may establish the connection with the second base station based on the third system information (e.g., SIB 2) being received through the wireless communication circuit 590.

According to various embodiments, the third system information may include information (e.g., upperLayerIndication-r15) indicating the higher layer of the cellular network. The upperLayerIndication-r15 may include information indicating that the electronic device 500 belongs to the higher layer, for example, the coverage of the second cellular network, when the electronic device 500 enters the coverage area that provides the second cellular network (e.g., 5G NR). If the second base station is located in the neighborhood of the first base station, the value of the upperLayerIndication-r15 may be "true", whereas if the second base station is not located in the neighborhood of the first base station, the value of the upperLayerIndication-r15 may be "false".

According to various embodiments, the communication processor 525 may identify whether there is an accessible (or neighboring) second base station (e.g., NR base station) based on the third system information. For example, the communication processor 525 may measure a signal broadcast from the second base station that is a target cell in a state where camp-on is maintained with respect to the first base station, and may identify the accessible second base station depending on whether the cell reselection criteria is satisfied as the result of the measurement.

If there is no neighboring second base station as the result of the identification, the communication processor 525 may end a process for the cell reselection of the second cellular network, and may establish (or maintain) a connection with the first base station of the first cellular network.

If the second base station is located in the neighborhood of the first base station (or if the value of the upperLayerIndication-r15 is "true"), the communication processor 525 may recognize the existence of the neighboring second base station, and may perform a search for the second base station. In this case, the communication processor 525 can identify only the existence/nonexistence of the neighboring second base station through the third system information, and thus an NR cell search process may be required.

According to various embodiments, when selecting the initial cell, the communication processor 525 may search for the NR cell in the following method, for example, in case that information on the channel of the NR frequency is not stored and in case that the previously stored information exists.

According to various embodiments, in selecting the initial cell, the communication processor 525 may successively search for the entire NR frequency bands being supported, or it may search for only the strongest cell with respect to the respective frequency bands, or if a proper cell is discovered, it may directly select the discovered cell.

According to various embodiments, the electronic device 500 may store, in the memory 530, a database including frequency information of the previously camped second cellular network. In this case, if it is identified that the second base station exists based on the third system information, the communication processor 525 may perform a search for establishing the connection with the second base station based on the frequency information stored in the database. Further, the communication processor 525 may search for the second base station by searching for the frequency band supporting the standalone (SA) based on the public land mobile network (PLMN) of the currently camped cell, or by searching for the frequency band supporting the SA based on information of a subscriber identification module (SIM) inserted into the electronic device 500.

According to various embodiments, the communication processor 525 may search for the second base station by individually or mixedly applying various searching algorithms exemplified and/or non-exemplified as above.

According to various embodiments, if the neighboring second base station is searched for through the above-described method, the communication processor 525 may establish the connection with the second base station.

Where the first base station is not broadcasting the second system information (SIB 24), various embodiments of an operation of reselecting the 5G SA cell will be described in detail through FIG. 7.

Figure 6:
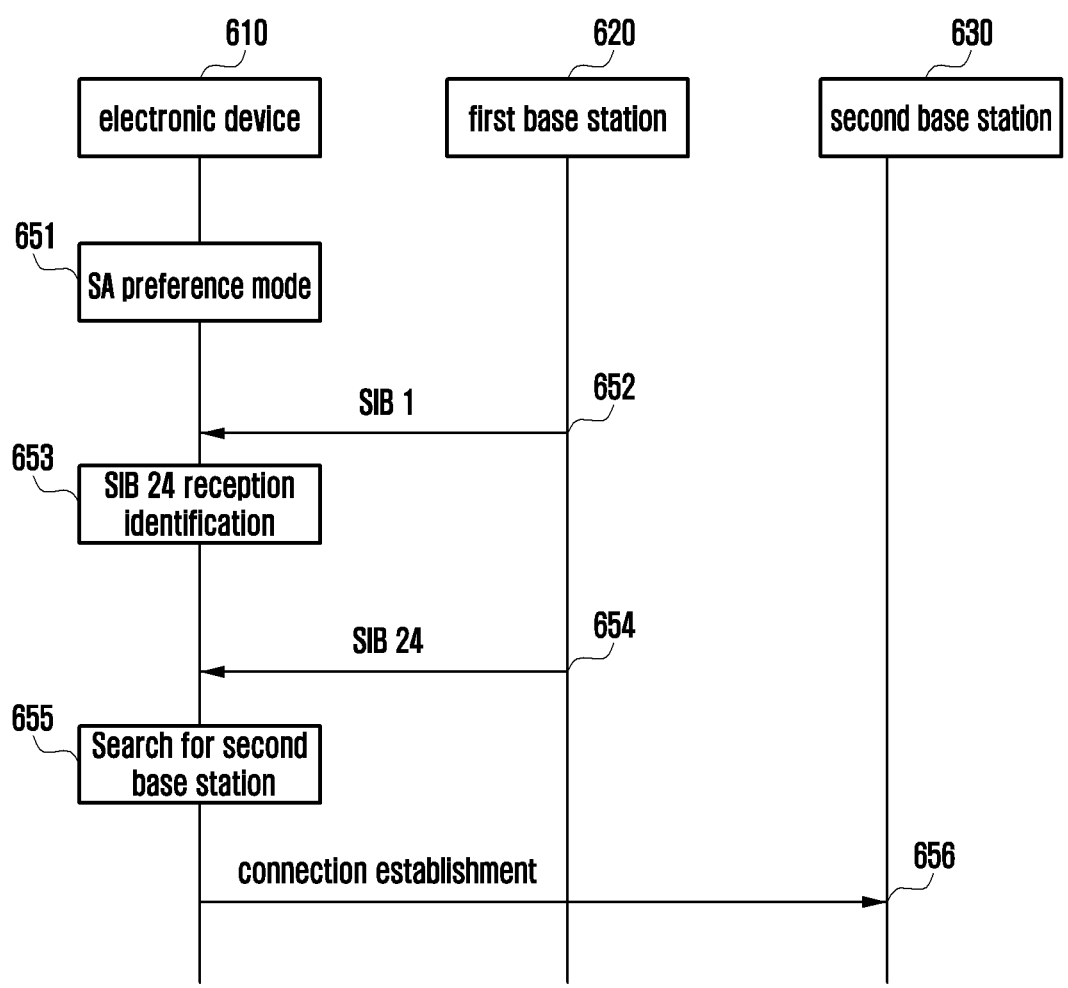
FIG. 6 is a signal flow diagram illustrating an example method by an electronic device for accessing a base station of a second cellular network based on SIB 24 according to various embodiments.

FIG. 6 is a signal flow diagram illustrating an example method by an electronic device for accessing a base station of a second cellular network based on SIB 24 according to various embodiments.

With reference to FIG. 6, in a network environment, an electronic device 610, a first base station 620, and a second base station 630 may be included. The first base station 620 may support the first cellular network (e.g., LTE), and may be an LTE base station (e.g., master node 410 of FIG. 4A or eNB) of a non-standalone (NSA) system. The second base station 630 may support the second cellular network (e.g., 5G NR), and may be an NR base station (e.g., NR base station 450 of FIG. 4C) of a standalone (SA) system.

FIG. 6 illustrates a cell reselection method where the first base station 620 is broadcasting SIB 24.

According to various embodiments, the electronic device 610 may operate in a standby mode during an initial turn-on and/or during movement, and may attempt to select or reselect the cell in the standby mode.

According to various embodiments, the electronic device 610 may identify the configuration of a second cellular network (e.g., 5G SA) preference mode (651). For example, the electronic device 610 may provide a GUI for selecting a network mode (e.g., 5G preference mode, LTE preference mode, 3G preference mode, or the like), and may configure the network mode in accordance with a user input. The electronic device 610 may identify the network mode configured as the SA preference mode.

According to various embodiments, the electronic device 610 may receive SIB 1 being broadcast from the first base station 620 (e.g., LTE base station) (652).

According to various embodiments, the electronic device 610 may identify whether the first base station 620 is broadcasting SIB 24 from the SIB 1 (653). The SIB 1 may include information on scheduling of the remaining SIBs, and the electronic device 610 may identify whether the corresponding first base station 620 is broadcasting the SIB 24 from system information (SI) scheduling information.

According to various embodiments, the electronic device 610 may receive the SIB 24 being broadcast from the first base station 620 (654). The SIB 24 may include information related to inter-radio access technology (RAT) reselection. The inter-RAT reselection may refer, for example, to reselection of the cell from the LTE network to the 5G NR network. The SIB 24 may include the frequency of the NR cell, information on the neighboring NR cell, and/or cell reselection parameters.

According to various embodiments, if the neighboring NR cell (or second base station) exists based on the SIB 24, the electronic device may perform a search for the second base station (655). For example, the electronic device 610 may identify the second base station that is the neighboring cell from the SIB 24 in a state where the camp-on is maintained with respect to the first base station 620, and may measure the signal broadcast from the second base station. The electronic device may identify the state where the 5G SA preference mode is currently configured, identify the neighboring cells, and then perform cell reselection with respect to the second base station supporting the 5G SA.

Further, the electronic device 610 may identify whether the cell reselection criteria is satisfied by comparing the measurement value of the signal of the first base station with the measurement value of the signal of the second base station. For example, parameters for the cell reselection criteria may be $S_{rxlev}$ (cell selection reception level), $Q_{rxlevmeas}$ (reception level measured by the electronic device with respect to the corresponding cell), and $Q_{rxlevmin}$ (minimum reception level required by the corresponding cell). If the cell reselection criteria is satisfied, the electronic device 610 may select and camp on the second base station.

According to various embodiments, the electronic device 610 may establish a connection with the searched second base station 630 (656). The electronic device may perform a connection process based on the system information being received from the second base station. If the cell reselection criteria is not satisfied, the electronic device may maintain the camp-on with respect to the cell of the first base station.

Figure 7:
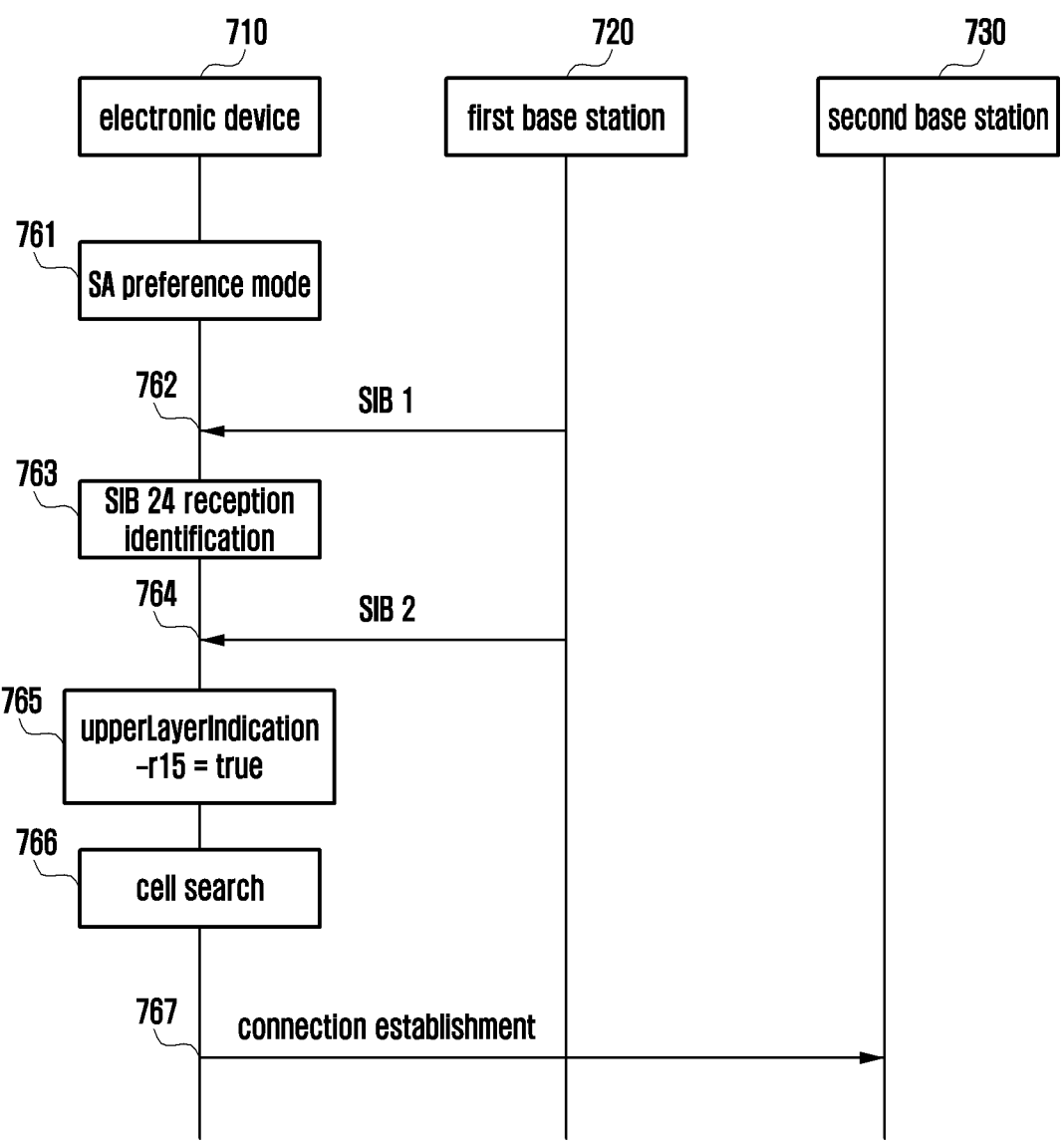
FIG. 7 is a signal flow diagram illustrating an example method by an electronic device for accessing a base station of a second cellular network based on SIB 2 according to various embodiments.

FIG. 7 is a signal flow diagram illustrating an example method by an electronic device for accessing a base station of a second cellular network based on SIB 2 according to various embodiments.

FIG. 7 illustrates a cell reselection method where a first base station 720 is not broadcasting SIB 24 (or second system information).

According to various embodiments, an electronic device 710 may operate in a standby mode during an initial turn-on and/or during movement, and may attempt to reselect the cell in the standby mode. According to various embodiments, the electronic device 710 may identify the configuration of a second cellular network (e.g., 5G SA) preference mode (761). According to various embodiments, the electronic device 710 may receive SIB 1 being broadcast from the first base station 720 (e.g., LTE base station) (762).

According to various embodiments, the electronic device 710 may identify whether the first base station 720 is broadcasting SIB 24 from the SIB 1 (763), and in this embodiment, the electronic device 710 may identify that the first base station 720 is not broadcasting the SIB 24.

According to various embodiments, the electronic device 710 may receive the SIB 2 broadcast from the first base station 720 (764). The SIB 2 may include information indicating a higher layer of the cellular network (e.g., upperLayerIndication-r15). The upperLayerIndication-r15 may include information indicating that the electronic device 710 belongs to the higher layer, for example, the coverage of the 5G NR network, when the electronic device 710 enters the coverage area of the 5G NR network.

According to various embodiments, the electronic device 710 may identify that the upperLayerIndication-r15 field of SIB 2 is "true" (765), and may search for the neighboring NR cell (766).

For example, during an initial cell selection, the communication processor may successively search for the entire NR frequency bands being supported, or it may search for only the strongest cell with respect to the respective frequency bands, or if a proper cell is discovered, the electronic device 710 may directly select the discovered cell.

According to various embodiments, the electronic device 710 may store, in the memory, a database including frequency information of the previously camped 5G NR network. In this case, if entering the coverage of the NR cell is identified based on SIB 2, the communication processor may perform a search for reselecting the NR cell based on the frequency information stored in the database. Further, the communication processor may search for the NR cell by searching for the frequency band supporting the standalone (SA) based on the public land mobile network (PLMN) of the currently camped cell, or by searching for the frequency band supporting the SA based on information of a subscriber identification module (SIM) inserted into the electronic device 710.

The electronic device 710 may establish a connection with the searched second base station 730 (767). For example, if the second base station 730 supporting the 5G SA and another base station supporting the 4G network are searched for, the electronic device 710 is in a state where it is configured in the 5G SA preference mode, and thus may establish the connection with the second base station 730. Further, if the cell reselection criteria is satisfied with respect to the searched second base station 730, the electronic device 710 may camp on the second base station 730, and may establish the connection with the second base station based on the system information being received from the second base station 730.

Figure 8:
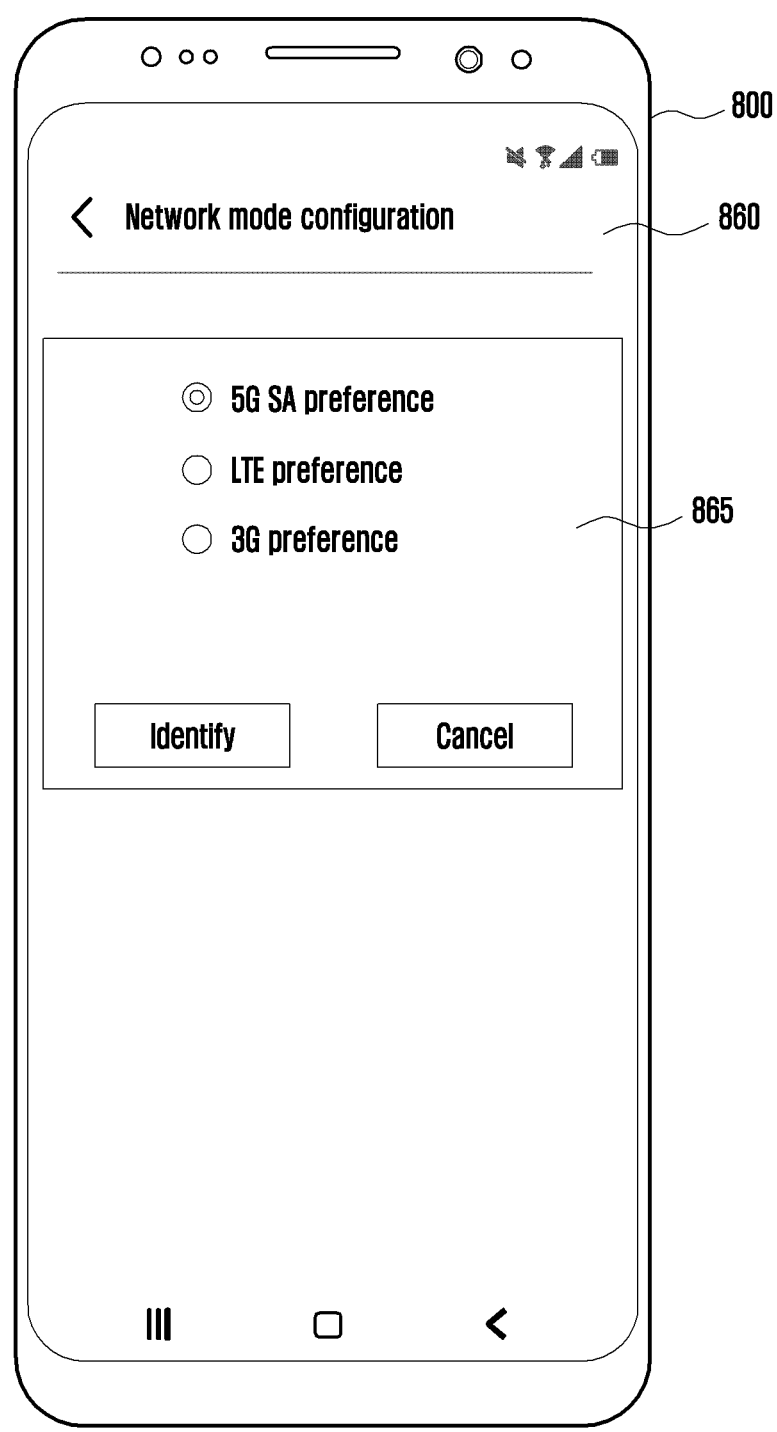
FIG. 8 is a diagram illustrating an example GUI for configuring a network mode of an electronic device according to various embodiments.

FIG. 8 is a diagram illustrating an example GUI for configuring a network mode of an electronic device according to various embodiments.

According to various embodiments, an electronic device 800 (e.g., processor 520 of FIG. 5) may configure a network to be accessed in accordance with a network mode configured by a user.

According to various embodiments, the electronic device 800 may provide a GUI 865 for selecting the network mode using a display 860. With reference to FIG. 8, the electronic device 800 may provide the GUI 865 for selecting any one of, for example, a 5G SA preference mode, an LTE preference mode, and 3G preference mode, which enable a preferential selection of any one of cellular networks supported by the electronic device 800. The illustrated GUI 865 corresponds to an embodiment, and is not limited thereto.

According to various embodiments, the priority of the network mode may be configured by an operator providing the cellular network, the electronic device 800 may configure the priority of the network mode in accordance with the camped-on PLMN, or the priority may be configured for respective base stations. The electronic device 800 may change the network mode as configured above in accordance with a user's selection through the GUI 865.

According to various embodiments, the operation of reselecting the cell of the 5G NR network supporting the standalone (SA) of FIG. 6 and/or FIG. 7 may be performed in case that the 5G SA preference mode is selected as the network mode.

An electronic device according to various example embodiments may include: a wireless communication circuit, and a processor operatively connected to the wireless communication circuit, wherein the processor is configured to: receive first system information broadcast from a first base station supporting a first cellular network using the wireless communication circuit, identify whether the first base station is broadcasting second system information including information of a second base station supporting a second cellular network neighboring the first base station from the first system information, establish a connection with the second base station based on the second system information being received using the wireless communication circuit based on identifying that the first base station is broadcasting the second system information, and establish the connection with the second base station based on third system information being received using the wireless communication circuit based on identifying that the first base station is not broadcasting the second system information.

According to various example embodiments, the first cellular network may be a 4G long term evolution (LTE) network, and the second cellular network may be a 5G new radio (NR) network.

According to various example embodiments, the second base station may support a standalone (SA) of the 5G NR network.

According to various example embodiments, the first system information may be system information block (SIB 1), and the second system information may be SIB 24.

According to various example embodiments, the processor may be configured to identify whether the first base station is broadcasting the second system information from system information (SI) scheduling information of the first system information.

According to various example embodiments, the third system information may be SIB 2, and the processor may be configured to identify whether the sec and base station neighboring the first base station exists by identifying information indicating a higher layer of a cellular network of the SIB 2.

According to various example embodiments, the information indicating the higher layer of the cellular network of the SIB 2 may be an upperLayerIndication-r15.

According to various example embodiments, the electronic device may further include a memory storing a database including frequency information of the sec and cellular network previously camped, and the processor may be configured to perform a search for establishing the connection with the second base station using the database based on identifying that the second base station neighboring the first base station exists based on the third system information.

According to various example embodiments, the processor may be configured to perform a search for establishing the connection with the second base station based on at least one of operations of searching for a frequency band supporting a standalone (SA) based on a public land mobile network (PLMN) of a currently camped cell, searching for the frequency band supporting the SA based on information of a subscriber identification module (SIM) inserted into the electronic device, a nd successively searching for the whole frequency band being supported by the wireless communication circuit.

Figure 9:
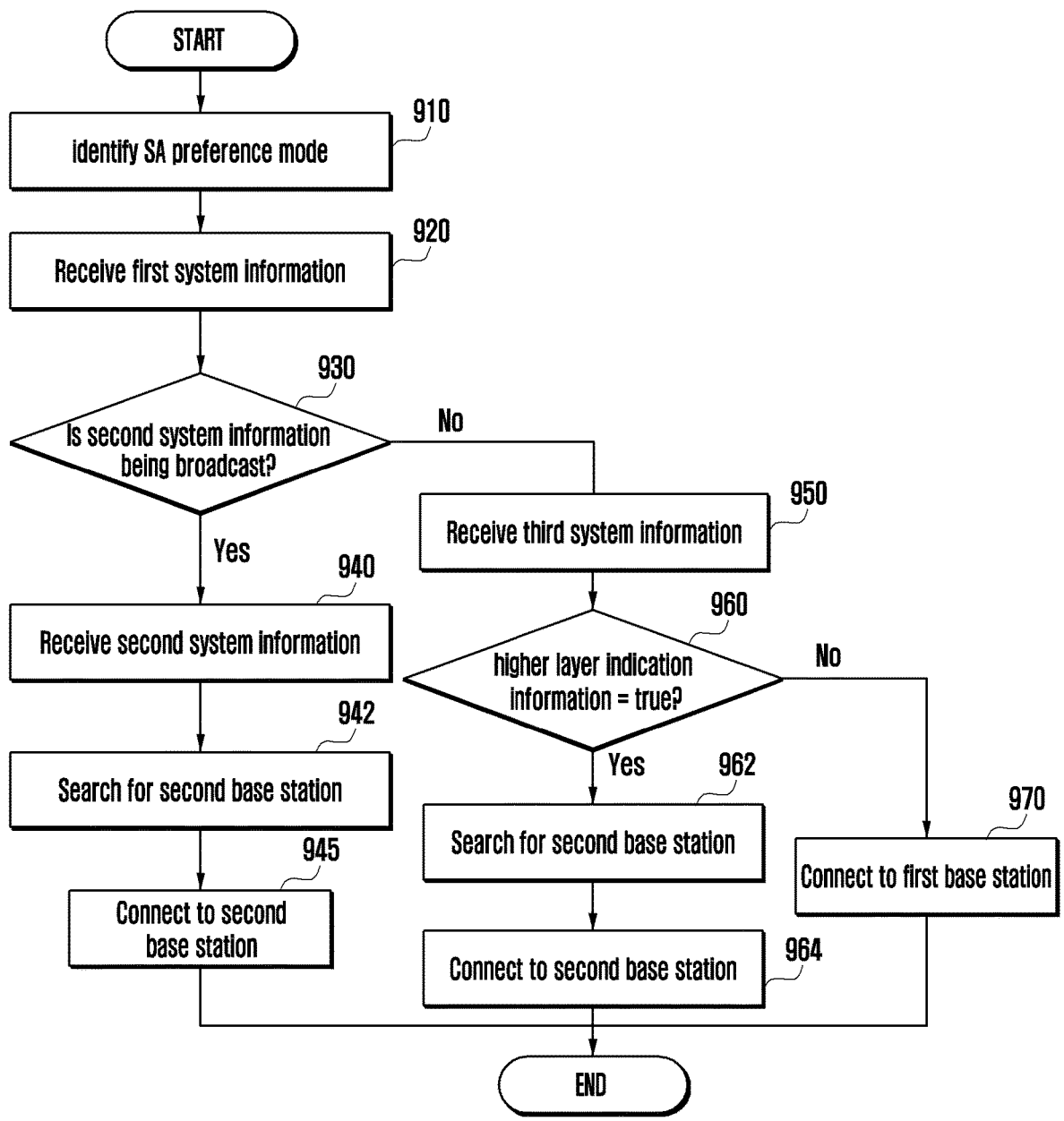
FIG. 9 is a flowchart illustrating an example cell selection method of an electronic device according to various embodiments.

FIG. 9 is a flowchart illustrating an example cell selection method of an electronic device according to various embodiments.

The method illustrated in FIG. 9 may be performed by the electronic device (e.g., electronic device 101 of FIG. 1 or electronic device 500 of FIG. 5) as described above through FIGS. 1 to 8, and hereinafter, explanation of the above-described technical features may not be repeated.

According to various embodiments, the electronic device (e.g., communication processor 525 of FIG. 5) may start cell reselection when it operates in a standby mode. The electronic device may operate in the standby mode during an initial turn-on and/or during movement. The standby mode may refer, for example, to a radio resource control (RRC) idle mode, and may correspond to a state where the network-resource control connection has not been made. In the RRC idle mode state, the electronic device may access a neighboring 5G NR cell by autonomously reselecting the cell.

According to various embodiments, at operation 910, the electronic device may identify the configuration of a second cellular network (e.g., 5G SA) preference mode.

According to various embodiments, at operation 920, the electronic device may receive first system information (e.g., SIB 1) broadcast from the first base station (e.g., LTE base station). The first base station may be an LTE base station of the NSA system. The first system information may include information related to whether the electronic device can use a service through an access to the corresponding cell. For example, the first system information may include at least one of operator information of the corresponding cell and information on restrictions during the cell access. Further, the first system information may include scheduling information on a time domain of the remaining system information (e.g., SIB 2 and SIB 24).

According to various embodiments, at operation 930, the electronic device may identify, from the first system information, whether the first base station is broadcasting second system information (e.g., SIB 24) including information of the second base station (e.g., NR base station) supporting the second cellular network (e.g., 5G NR network) neighboring the first base station. The second base station may be an NR base station of the SA system. The electronic device may identify whether the first base station is broadcasting the second system information from the system information (SI) scheduling information of the first system information.

According to various embodiments, if it is identified that the first base station is broadcasting the second system information (930—Yes), the electronic device, at operation 940, may receive the second system information from the first base station.

According to various embodiments, if a neighboring NR cell (or second base station) exists, the electronic device, at operation 942, may perform a search for the second base station based on SIB 24. For example, the electronic device may identify the second base station that is the neighboring cell from the SIB 24, and may measure the signal broadcast from the second base station. The electronic device may identify the state where the 5G SA preference mode is currently configured, identify the neighboring cells, and then perform cell reselection with respect to the second base station supporting the 5G SA. Further, the electronic device may identify whether the cell reselection criteria is satisfied by comparing the measurement value of the signal of the first base station with the measurement value of the signal of the second base station. For example, parameters for the cell reselection criteria may be $S_{rxlev}$ (cell selection reception level), $Q_{rxlevmeas}$ (reception level measured by the electronic device with respect to the corresponding cell), and $Q_{rxlevmin}$ (minimum reception level required by the corresponding cell). If the cell reselection criteria is satisfied, the electronic device may select and camp on the second base station.

According to various embodiments, at operation 945, the electronic device may establish a connection with the second base station based on the second system information.

According to various embodiments, if it is identified that the first base station is not broadcasting the second system information at operation 930 (930—No), the electronic device, at operation 950, may receive third system information (e.g., SIB 2) broadcast from the first base station. The third system information may include information (e.g., upperLayerIndication-r15) indicating the higher layer of the cellular network. The upperLayerIndication-r15 may include information indicating that the electronic device belongs to the higher layer, for example, the coverage of the second cellular network, when the electronic device enters the coverage area that provides the second cellular network (e.g., 5G NR).

According to various embodiments, at operation 960, the electronic device may identify whether higher layer indication information of the third system information is "true".

If the higher layer indication information of the third system information is "true" (960—Yes) as the result of the identification, the electronic device, at operation 962, may identify that the neighboring second base station exists, and may search for the second base station.

At operation 964, the electronic device may establish the connection with the searched second base station.

For example, if the second base station 730 supporting the 5G SA and another base station supporting the 4G network are searched for, the electronic device is in a state where it is configured in the 5G SA preference mode, and thus may establish the connection with the second base station 730. Further, if the cell reselection criteria is satisfied with respect to the second base station 730, the electronic device may establish the connection with the second base station based on the system information being received from the second base station.

If the higher layer indication information is "false" (960—No) as the result of the identification at operation 960, the electronic device, at operation 970, may end the cell reselection process of the second cellular network, and may maintain the connection with the first base station of the first cellular network.

Figure 10:
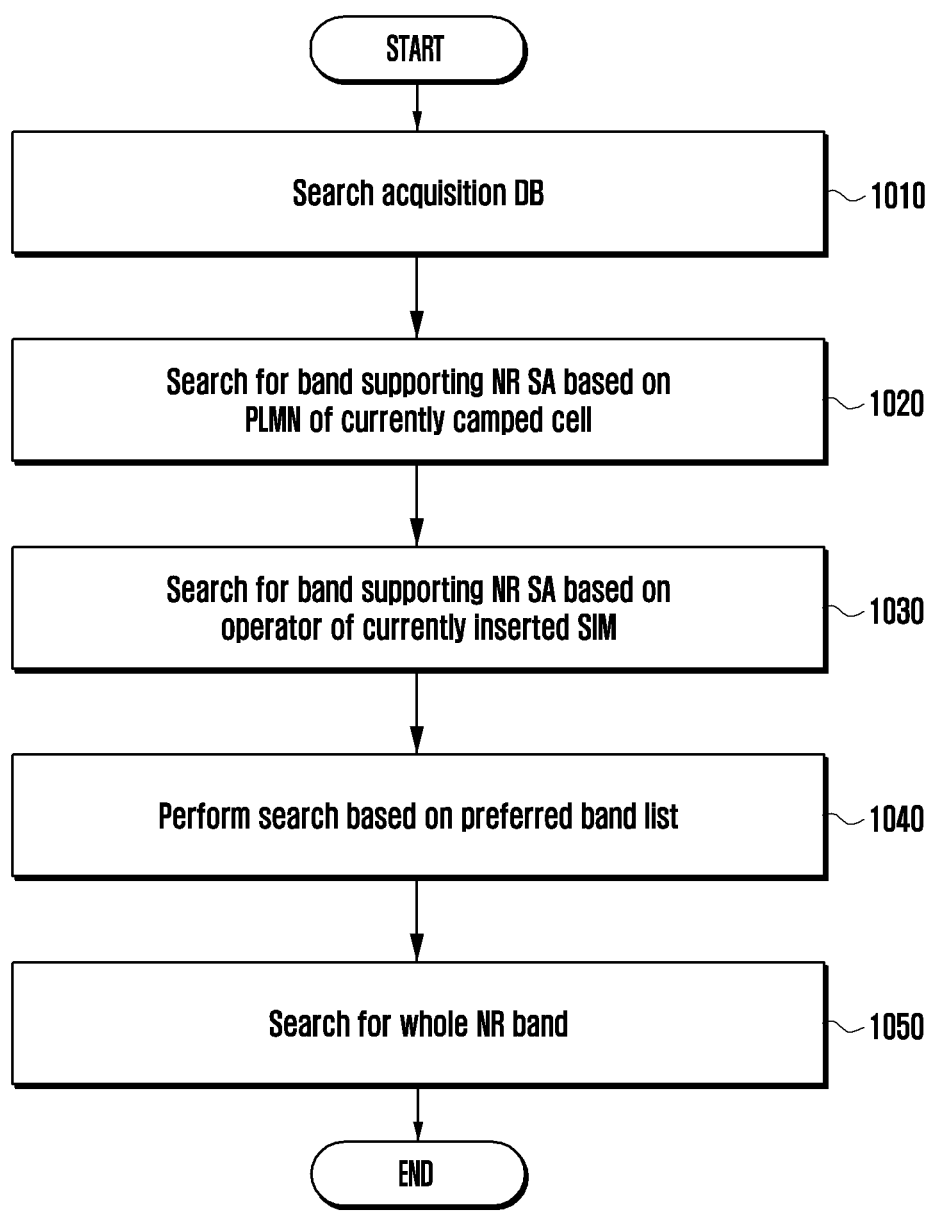
FIG. 10 is a flowchart illustrating an example method by an electronic device for searching for a base station of a second cellular network according to various embodiments.

FIG. 10 is a flowchart illustrating an example method by an electronic device for searching for a base station of a second cellular network according to various embodiments.

The method of FIG. 10 may include an operation 962 of searching for the second base station of FIG. 9. The illustrated method corresponds to an embodiment, and the electronic device may search for the second base station further using various cell search methods (not illustrated). Further, illustrated operations 1010, 1020, 1030, 1040, and 1050 may not be successively performed, and parts thereof may be omitted, and/or the order thereof may be changed.

According to various embodiments, at operation 1010, the electronic device may search for a frequency band stored in an acquisition DB. The acquisition DB may refer, for example, to a database including the frequency information of the second cellular network previously camped, and may be stored in the memory.

According to various embodiments, at operation 1020, the electronic device may search for the frequency band supporting the NR standalone (SA) based on the public land mobile network (PLMN) of the currently camped cell.

According to various embodiments, at operation 1030, the electronic device may search for the second base station by searching for the frequency band supporting the SA based on the information of the subscriber identification module (SIM) inserted into the electronic device.

According to various embodiments, at operation 1040, the electronic device may search for the second base station based on a preferred band list stored in the memory.

According to various embodiments, at operation 1050, the electronic device may successively search for the whole NR frequency band being supported.

If the second base station is searched for using at least parts of operations 1010 to 1050, the electronic device may attempt a connection with the searched second base station.

According to various embodiments, if the network mode configured on the electronic device 500 is a mode configured to preferentially access the second cellular network, the processor 520 may be configured to establish the connection with the second base station based on the second system information or the third system information.

A cell selection method of an electronic device according to various example embodiments may include: receiving first system information broadcast from a first base station supporting a first cellular network, identifying whether the first base station is broadcasting second system information including information of a second base station supporting a second cellular network neighboring the first base station from the first system information, establishing a connection with the second base station based on the second system information received using a wireless communication circuit based on identifying that the first base station is broadcasting the second system information, and establishing the connection with the second base station based on third system information received using the wireless communication circuit based on identifying that the first base station is not broadcasting the second system information.

According to various example embodiments, the first cellular network may be a 4G long term evolution (LTE) network, and the second cellular network may be a 5G new radio (NR) network.

According to various example embodiments, the second base station may support a standalone (SA) of the 5G NR network.

According to various example embodiments, the first system information may be system information block (SIB) SIB 1, and the second system information may be SIB 24.

According to various example embodiments, identifying whether the first base station is broadcasting the second system information may include identifying whether the first base station is broadcasting the second system information from system information (SI) scheduling information of the first system information.

According to various example embodiments, the third system information may be SIB 2, and establishing the connection with the second base station based on the third system information may include identifying whether the second base station neighboring the first base station exists by identifying information indicating a higher layer of a cellular network of the SIB 2.

According to various example embodiments, the information indicating the higher layer of the cellular network of the SIB 2 may be an upperLayerIndication-r15.

According to various example embodiments, establishing the connection with the second base station based on the third system information may include performing a search for establishing the connection with the second base station using a database including frequency information of the second cellular network previously camped based on identifying that the second base station neighboring the first base station exists based on the third system information.

According to various example embodiments, establishing the connection with the second base station based on the third system information may include performing a search for establishing the connection with the second base station based on at least one of operations of searching for a frequency band supporting a standalone (SA) based on a public land mobile network (PLMN) of a currently camped cell, searching for the frequency band supporting the SA based on information of a subscriber identification module (SIM) inserted into the electronic device, and successively searching for the whole frequency band being supported by the wireless communication circuit.

According to various embodiments, the connection with the second base station may be established based on the second system information or the third system information in case that a network mode configured on the electronic device 500 is a mode configured to preferentially access the second cellular network.

While the disclosure has been illustrated and described with reference to various example embodiments, it will be understood that the various example embodiments are intended to be illustrative, not limiting. It will be further understood by one of ordinary skill in the art that various changes in form and detail may be made without departing from the true spirit and full scope of the disclosure, including the appended claims and their equivalents.

What is claimed is:

1. An electronic device comprising:
a wireless communication circuit; and
a processor operatively connected to the wireless communication circuit,
wherein the processor is configured to:
receive first system information broadcast from a first base station supporting a first cellular network using the wireless communication circuit,
identify whether the first base station is broadcasting second system information including information of a second base station supporting a second cellular network neighboring the first base station from the first system information,
establish a connection with the second base station based on the second system information being received using the wireless communication circuit based on identifying that the first base station is broadcasting the second system information, and
establish the connection with the second base station based on third system information being received using the wireless communication circuit based on identifying that the first base station is not broadcasting the second system information.

2. The electronic device of claim 1, wherein the first cellular network is a 4G long term evolution (LTE) network, and
the second cellular network is a 5G new radio (NR) network.

3. The electronic device of claim 2, wherein the second base station supports a standalone (SA) of the 5G NR network.

4. The electronic device of claim 1, wherein the first system information is system information block (SIB) 1, and the second system information is SIB 24.

5. The electronic device of claim 4, wherein the processor is configured to identify whether the first base station is broadcasting the second system information from system information (SI) scheduling information of the first system information.

6. The electronic device of claim 1, wherein the third system information is SIB 2, and the processor is configured to identify whether the second base station neighboring the first base station exists by identifying information indicating a higher layer of a cellular network of the SIB 2.

7. The electronic device of claim 6, wherein the information indicating the higher layer of the cellular network of the SIB 2 is an upperLayerIndication-r15.

8. The electronic device of claim 5, further comprising a memory storing a database including frequency information of the second cellular network previously camped,
wherein the processor is configured to perform a search for establishing the connection with the second base station using the database based on identifying that the second base station neighboring the first base station exists based on the third system information.

9. The electronic device of claim 5, wherein the processor is configured to perform a search to establish the connection with the second base station based on at least one of operations of:
searching for a frequency band supporting a standalone (SA) based on a public land mobile network (PLMN) of a currently camped cell,
searching for the frequency band supporting the SA based on information of a subscriber identification module (SIM) of the electronic device, and
successively searching for a whole frequency band supported by the wireless communication circuit.

10. The electronic device of claim 1, wherein the processor is configured to establish the connection with the second base station based on the second system information or the third system information based on a network mode configured on the electronic device being a mode configured to preferentially access the second cellular network.

11. A cell selection method of an electronic device, comprising:
receiving first system information broadcast from a first base station supporting a first cellular network;

identifying whether the first base station is broadcasting second system information including information of a second base station supporting a second cellular network neighboring the first base station from the first system information;

establishing a connection with the second base station based on the second system information being received using a wireless communication circuit based on identifying that the first base station is broadcasting the second system information; and establishing the connection with the second base station based on third system information being received using the wireless communication circuit based on identifying that the first base station is not broadcasting the second system information.

12. The method of claim 11, wherein the first cellular network is a 4G long term evolution (LTE) network, and
the second cellular network is a 5G new radio (NR) network.

13. The method of claim 12, wherein the second base station supports a standalone (SA) of the 5G NR network.

14. The method of claim 11, wherein the first system information is system information block (SIB) 1, and
the second system information is SIB 24.

15. The method of claim 14, wherein identifying whether the first base station is broadcasting the second system information comprises identifying whether the first base station is broadcasting the second system information from system information (SI) scheduling information of the first system information.

16. The method of claim 11, wherein the third system information is SIB 2, and establishing the connection with the second base station based on the third system information comprises identifying whether the second base station neighboring the first base station exists by identifying information indicating a higher layer of a cellular network of the SIB 2.

17. The method of claim 16, wherein the information indicating the higher layer of the cellular network of the SIB 2 is an upperLayerIndication-r15.

18. The method of claim 15, wherein establishing the connection with the second base station based on the third system information comprises performing a search for establishing the connection with the second base station using a database including frequency information of the second cellular network previously camped based on identifying that the second base station neighboring the first base station exists based on the third system information.

19. The method of claim 15, wherein establishing the connection with the second base station based on the third system information comprises performing a search to establish the connection with the second base station based on at least one of operations of:

searching for a frequency band supporting a standalone (SA) based on a public land mobile network (PLMN) of a currently camped cell;

searching for the frequency band supporting the SA based on information of a subscriber identification module (SIM) inserted into the electronic device; and successively searching for a whole frequency band supported by the wireless communication circuit.

20. The method of claim 11, the connection with the second base station is established based on the second system information or the third system information based on a network mode configured on the electronic device being a mode configured to preferentially access the second cellular network.

* * * * *